(12) United States Patent
Carnahan et al.

(10) Patent No.: US 6,307,004 B1
(45) Date of Patent: *Oct. 23, 2001

(54) METHOD FOR PARALLEL MELT-POLYMERIZATION

(75) Inventors: James Claude Carnahan, Niskayuna; John Patrick Lemmon, Delanson; Radislav Alexandrovich Potyrailo; Terry Kay Leib, both of Niskayuna; Gregory Lee Warner, Schenectady, all of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/398,677

(22) Filed: Sep. 20, 1999

(51) Int. Cl.⁷ .................................................. C08G 64/00
(52) U.S. Cl. ............................................................ 528/196
(58) Field of Search ............................................. 528/196

(56) References Cited

U.S. PATENT DOCUMENTS

| | | | |
|---|---|---|---|
| 5,472,672 | 12/1995 | Brennan | 422/131 |
| 5,609,826 | 3/1997 | Cargill et al. | 422/99 |
| 5,785,927 | 7/1998 | Scott et al. | 422/104 |
| 5,792,431 | 8/1998 | Moore et al. | 422/134 |
| 5,985,356 | 11/1999 | Schultz et al. | 427/8 |

FOREIGN PATENT DOCUMENTS

| | | |
|---|---|---|
| WO 93/09668 | 5/1993 | (WO) . |
| WO 99/04247 | 1/1999 | (WO) . |

*Primary Examiner*—Terressa M. Boykin
(74) *Attorney, Agent, or Firm*—Noreen C. Johnson; Douglas E. Stoner

(57) ABSTRACT

In an exemplary embodiment, the method includes the steps of providing an array of reaction vessels and providing a plurality of homogenous reaction mixtures within the reaction vessels. Each mixture comprises monomers at least partially embodied in a liquid and is provided in an amount sufficient to form a film having a thickness sufficient to allow the reaction rate of the polymerization reaction to be essentially independent of mass transport. Polymerization then takes place in the presence of a catalyst at reaction conditions effective in substantially maintaining the homogeneity of the reaction mixture. In this manner, polymerization can take place quickly and efficiently without stirring the reactants. The method is highly useful for testing reactants, catalysts, and associated reaction parameters.

40 Claims, 7 Drawing Sheets

METHOD FOR PARALLEL MELT-POLYMERIZATION

BACKGROUND OF THE INVENTION

1. Field of the Invention

This invention relates to parallel reactions.

2. Discussion of Related Art

Traditionally, investigating the efficacy of catalysts and optimizing reaction conditions for melt polymerizations has been carried out one reaction at a time with the resulting polymer analyzed upon completion of the polymerization. The scale of these reactions has generally ranged from several grams to several hundred grams and, thus, stirring is required for good heat transfer, for distribution of small amounts of catalyst, and to renew surfaces in those reactions that required loss of a volatile by-product to drive the reaction to completion. In addition, due to mass transport limitations in thick samples, reduced pressures in the headspace over the reaction are typically used to facilitate removal of by-products from the reaction. Furthermore, traditional prior art parallel polymerizations are generally carried out for biochemical reaction mixtures at temperatures well below 100° C.

In U.S. Pat. No. 5,609,826, Cargill et al. refer to a reaction block that uses replaceable reaction chambers supported in the block. Each reaction block is fitted with four sets of 12 reaction chambers, and has fittings that facilitate robotic manipulation. The reaction chambers are fitted with a frit. An s-shaped trap tube snaps into a fitting on the bottom of each reaction chamber. The trap tube runs into a drain tube. The reaction block is preferably fitted with gas (preferably $N_2$) lines and a septum seal such that gas pressurization empties the reaction chambers into the drain tubes. The drain tubes are arranged to mate directly with a standard 96 well microtiter plate for the collection of material. A docking station provides for secure registration of the reaction blocks, and provides for introduction of gases and liquids into the reaction blocks. An inert atmosphere in the reaction block is maintained by a top and (optional) bottom seal. A synthesis support may be introduced into each reaction chamber as a slurry, and the top septum fastened. A needle pipettes reagents from an array of reagent containers into the reaction chambers, and maintains the inert atmosphere. A locking reagent container rack keeps the containers securely in place.

As the demand for high performance materials has continued to grow, new and improved methods of providing improved products more economically are needed to supply the market. Due in part to the advantages inherent in polymer production by the melt process, there is significant interest among industry members in producing polymers with low Fries product content. In this context, various reactant and catalyst combinations for melt polymerization are constantly being evaluated; however, the identities of chemically or economically superior reactant systems for melt polymerization processes continue to elude the industry. As parallel screening gains popularity in all areas of chemistry, high-throughput screening of potential reactant systems will become increasingly important. As such, new and improved methods are needed for rapid production and quantification of reaction products.

SUMMARY

Accordingly, the present invention is directed to an elegant method of conducting parallel reactions at a micro scale. The method includes the steps of providing an array of reaction vessels and providing a plurality of homogenous reaction mixtures within the reaction vessels. Each mixture comprises monomers at least partially embodied in a liquid and is provided in an amount sufficient to form a film having a thickness sufficient to allow the reaction rate of the polymerization reaction to be essentially independent of mass transport. Polymerization then takes place in the presence of a catalyst at reaction conditions effective in substantially maintaining the homogeneity of the reaction mixture. In this manner, polymerization can take place without stirring the reactants.

The method is particularly useful for reactions that produce polycarbonates, such as the reaction of diarylcarbonates and bisphenols to produce polycarbonates. Other polymer reactions amenable to utilization of the present method include ring-opening polymerizations and melt polymerizations to form polyesters, polyamides, polyimides, and mixed co-polymers. Generally, the method is useful for discovery of new catalysts, for optimization of reaction conditions, and for evaluation of new monomers to produce new polymers on a micro-scale in quantities sufficient for traditional characterization.

BRIEF DESCRIPTION OF THE DRAWINGS

Various features, aspects, and advantages of the present invention will become more apparent with reference to the following description, appended claims, and accompanying drawings, wherein

DETAILED DESCRIPTION

In an exemplary embodiment, the method is directed to conducting parallel polymerizations in thin films using substantially homogenous starting mixtures. In this manner, multiple reactions may be run in parallel without the need for stirring, yet still provide good homogeneity of the reaction mixtures.

Figure 1:
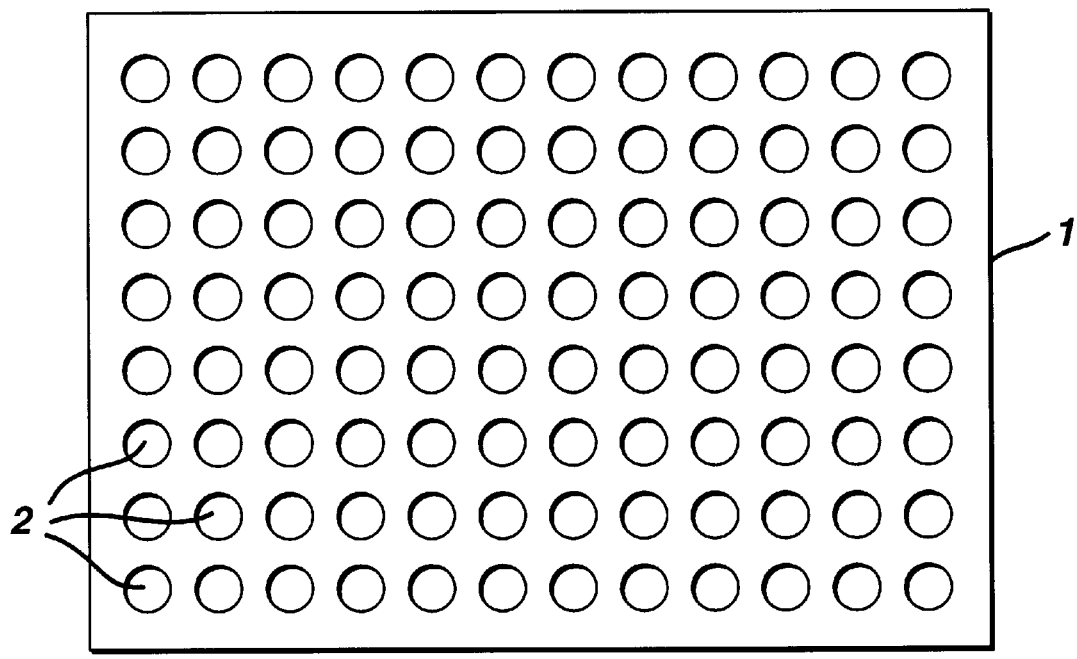
FIG. 1 is a top plan view of an exemplary microtiter plate.

Referring to FIG. 1, in one embodiment of the invention, the reactions are carried out in shallow wells or dimples 2 in a flat plate 1. The plate may be constructed of any material suitable for the reaction conditions used, such as ceramic, metal, glass, or polymers. Composites of these materials may also be utilized. It is preferred that a large number of wells 2 be provided, such as in a "microtiter" plate. These plates are generally available in 96-well versions, though higher numbers of wells may be preferable in a given application.

A plurality of homogenous reaction mixtures are provided within the reaction vessels. The reactants can be added to the wells as separate components, as a homogeneous mixture, or dissolved in a fugitive solvent. A catalyst system can be added with the reactants or separately, for example, using a robotic dispenser to vary and control the amount of catalyst added.

In a preferred embodiment, the monomers are premixed together to substantially homogenize them prior to charging the wells. If the monomers are solid at room temperature, then it may be necessary to melt them for this purpose and then permit them to resolidify if the reaction is not to be carried out right away. The wells are then charged with small quantities of the mixed reactants, generally less than 1 gram, preferably less than 100 mg, and still more preferably less than 50 mg. The amount of reaction mixture will generally be small enough to form a reaction film having a thickness that allows the reaction rate of the polymerization reaction to be "essentially independent" of mass transport, preferably without stirring. As noted, the catalyst can be introduced into the reaction mixture either simultaneously with the charge or afterwards.

As used herein, the term "essentially independent" means that, in comparison with other possible rate limiting factors, mass transport limitations are sufficiently low to allow comparative evaluations of potential reactant system components. Optimum film thickness values can vary based on reaction conditions and the identity of reactant system components. Those skilled in the art will readily realize that in various systems, a minimum film thickness may be required to overcome the effects of evaporation or the formation of micro amounts of precipitate and the like. As such, optimum film thickness may not equate to the thinnest possible film that can be formed in a given application. Furthermore, the amount of reaction mixture utilized is preferably chosen such that the loss of volatile by-products is not limited by diffusion through the film.

In alternative embodiments, the reactions are carried out in vials (not shown) by depositing a thin film of reaction mixture at the bottom of each vial. Polymerization is carried out under conditions that allow the homogeneity of the reaction mixture to be substantially maintained during the reaction. Substantially maintaining homogeneity typically involves preventing significant evaporation of reactants.

When carrying out the present method, it is preferred that the reaction temperature be increased over the course of the reaction, either smoothly and continuously or in discrete stages. In order to substantially maintain homogeneity, it is preferred that the reaction be allowed to substantially reach equilibrium before further increasing reaction temperature. A typical program of temperature increases includes raising the reaction temperature in the range of about 100° C. to about 200° C., preferably about 150° C. to about 200° C., more preferably about 175° C. to about 185° C., and maintaining that reaction temperature for about 5 to about 60 minutes, preferably about 15 to about 45 minutes, more preferably about 15 to about 30 minutes.

Secondly, the reaction temperature can be raised in the range of about 210° C. to about 260° C., preferably about 220° C. to about 250° C., more preferably about 240° C. to about 245° C., and maintained for about 5 to about 60 minutes, preferably about 15 to about 45 minutes, more preferably about 15 to about 30 minutes.

The reaction temperature can then be raised in the range of about 270° C. to about 400° C., preferably about 280° C. to about 350° C., more preferably about 285° C. to about 310° C., and maintained for about 5 to about 60 minutes, preferably about 15 to about 45 minutes, more preferably about 15 to about 30 minutes.

Optionally, an additional step with a reaction temperature of from about 230° C. to about 250° C., preferably about 240° C. for similar time periods may be penultimately added prior to the third step as demonstrated in Example 1 below.

Alternatively, the temperature may be smoothly "ramped" to the maximum temperature without discrete temperature plateaus, but one must be careful not to raise the temperature so quickly as to prevent the reaction mixture to substantially reach chemical equilibrium. Discrete temperature plateaus are therefore more preferred. The reaction temperature is ramped upward, inter alia, to prevent evaporation of the reaction mixture. Generally, the components of the reaction mixture are most volatile at the beginning of the reaction, because the reaction mixture at that time mostly comprises unreacted monomer. As the polymerization progresses, polymer products having higher boiling points are produced, allowing the reaction temperature to be increased. Hence, the method and timing of increasing the temperature over time is preferably chosen to be effective in avoiding substantial loss of reaction components through vaporization.

In various embodiments, the reaction conditions include heating the reaction mixture in a flowing inert gas (e.g., nitrogen) atmosphere or in a vacuum chamber. Alternatively, the method can include heating the reaction mixture in a flowing inert gas atmosphere followed by application of a vacuum.

In various embodiments, the present method can be particularly advantageous for evaluating catalyst for use in melt polymerizations, such as the formation of polycarbonates. As used herein, the terms "polycarbonate", "polycarbonate composition", and "composition comprising aromatic carbonate chain units" includes compositions having structural units of the formula (I):

in which at least about 60 percent of the total number of $R^6$ groups are aromatic organic radicals and the balance thereof are aliphatic, alicyclic, or aromatic radicals. Preferably, $R^6$ is an aromatic organic radical and, more preferably, a radical of the formula (II):

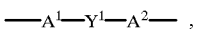

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)— or —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be derived from dihydroxy compounds in which only one atom separates $A^1$ and $A^2$. As used herein, the term "dihydroxy compound" includes, for example, bisphenol compounds representative of general formula (III) as follows:

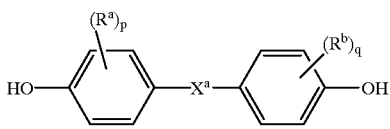

(III)

In formula (III), $R^a$ and $R^b$ each represent a halogen atom or a monovalent hydrocarbon group and may be the same or different. The p and q variables represent integers from 0 to 4. The $X^a$ variable represents one of the following groups:

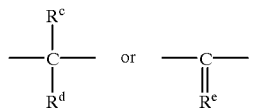

Variables $R^c$ and $R^d$ each independently represent a hydrogen atom or a monovalent hydrocarbon group. Variables $R^c$ and $R^d$ may form a ring structure. Variable $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes the following:

1,1-bis(4-hydroxyphenyl) methane;
1,1-bis(4-hydroxyphenyl) ethane;
2,2-bis(4-hydroxyphenyl) propane (hereinafter referred to as "bisphenol A" or "BPA");
2,2-bis(4-hydroxyphenyl)butane;
2,2-bis(4-hydroxyphenyl)octane;
1,1-bis(4-hydroxyphenyl)propane;
1,1-bis(4-hydroxyphenyl)n-butane;
bis(4-hydroxyphenyl)phenylmethane;
2,2-bis(4-hydroxy-1-methylphenyl)propane;
1,1-bis(4-hydroxy-t-butylphenyl)propane;
bis(hydroxyaryl) alkanes such as 2,2-bis(4-hydroxy-3-bromophenyl)propane;
1,1-bis(4-hydroxyphenyl)cyclopentane; and
bis(hydroxyaryl) cycloalkanes such as 1,1-bis(4-hydroxyphenyl)cyclohexane.

Preferred polycarbonates are bisphenol A polycarbonates, in which each of $A^1$ and $A^2$ is p-phenylene and $Y^1$ is isopropylidene. Preferably, the average molecular weight of the initial polycarbonate ranges from about 5,000 to about 100,000; more preferably from about 10,000 to about 65,000, and most preferably from about 15,000 to about 35,000.

Other melt polymerization reactions include the synthesis of polyetherimide and poly(butyl)terepthalate. Melt-polymerizations are easily quenched by simply cooling the reaction mixture. Since the reaction mixtures of the present method are thin films, this is easily accomplished.

In addition to bisphenol-A polymerizations, the method may be applied to the production of soft-segment polycarbonates and high-heat polycarbonates. Such polycarbonates can be prepared by many methods, including transesterification in a solvent-free reaction mixture with diphenylcarbonate and a bisphenol, and the diphasic/interface process with phosgene and a bisphenol.

Soft-segment polycarbonates are copolyestercarbonates having reduced glass-transition temperatures. Such materials can be polymerized by art-recognized methods, such as those found in U.S. Pat. Nos. 3,030,331 and 3,169,121, both issued to Goldberg; and in U.S. Pat. Nos. 4,130,548 and 4,286,083, both issued to Kochanowski, the disclosures of all of which are incorporated by reference herein in their entirety.

High-heat polycarbonates can be prepared by a number of art-recognized methods, such as those disclosed by Mark et al. in U.S. Pat. No. 4,576,996; St. Clair et al. in U.S. Pat. No. 4,713,439; DeBona et al. in U.S. Pat. No. 4,310,652; Nakae, M. in U.S. Pat. No. 5,391,693; and Serini et al. in U.S. Pat. No. 5,034,458; the disclosures of all of which are incorporated by reference herein in their entirety.

The polymers produced using the methods of the invention will generally have a molecular weight in the range of 2,000 to 100,000, preferably 5,000 to 50,000, and more preferably 10,000 to 20,000. Molecular weights can be determined by Gel Permeation Chromatography (GPC) calibrated with polystyrene standards or light-scattering visiometry. The molecular weight distribution (MWD) of the polymer product will generally be less than 4, preferably less than 3, more preferably less than 2.5.

The products of the reaction can be analyzed to determine the presence of certain functional groups in multiple reactors simultaneously. In monitoring and evaluating polycarbonate synthesis, it is of particular interest to determine the concentration of Fries product present in the polycarbonate. The generation of significant Fries product can lead to polymer branching, resulting in uncontrollable melt behavior. As used herein, the terms "Fries" and "Fries product" denote a repeating unit in polycarbonate having the following formula:

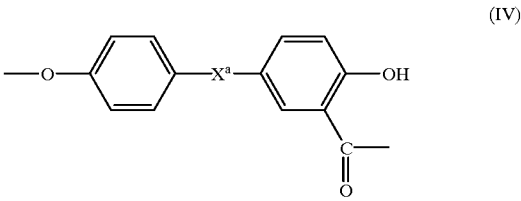

(IV)

wherein $X^a$ is a bivalent radical as described in connection with Formula (III) supra. The Fries reaction products are generally part of the polymer composition and they exhibit a readily excited fluorescence. Hence, the Fries products may be detected by fluorescence spectroscopy.

Commercially available microplate fluorometers, such as that sold under the tradename FLUOROSKAN II by Labsystems of Helsinki, Finland, may be modified for application with flat-bottom microtiter plates. Such devices may typically have a xenon lamp capable of fluorescence measurements over the 320 nm to 700 nm excitation range and 390 nm to 800 nm emission range. Integration times for reading each of the wells will generally be in the range of from about 0.1 to about 10 seconds. The fluorometer is modified by increasing the depth of a compartment that holds the microtiter plate. This modification is needed on some models because the microtiter plates preferably used for this invention tend to have deeper wells than those for which some fluorometers are designed to hold.

EXAMPLES

The following examples are provided in order that those skilled in the art will be better able to understand and practice the present invention. These examples are intended to serve as illustrations and not as limitations of the present invention as defined in the claims herein.

Example 1

A test of the invention concept was carried out using the base-catalyzed melt polymerization of bisphenol-A (BPA) and diphenylcarbonate (DPC) as an example. A thin metal reaction array was prepared by forming three rows of four 1.5 mm deep wells in the surface of a chromium plated brass sheet. In this example, a mixture of 228 mg of BPA and 230 mg of DPC were melted together and cast as a super-cooled solid on a cold Teflon-coated foil sheet. Portions of this were transferred to several of the wells in the array. Other wells contained reference materials, a blank well and reaction mixture with no catalyst. A map of the array plate is shown in Table 1 below. The catalyst system included dilute sodium hydroxide, $KHCO_3$, and high-sodium-level tap water.

TABLE 1

Arrangement of Reactions in Array Plate. Mix = 228 mg BPA + 230 mg DPC.

| Mix + 25 µl Niskayuna tap water | 500 ppm LF-Fries | 1000 ppm LF-Fries | 2000 ppm LF-Fries |
|---|---|---|---|
| Mix only | Mix + 2 µg NaOH | Mix only | Mix + 2 µg NaOH |
| PC-125 (LF Resin) | Mix + 2 µg $KHCO_3$ | Mix + 2 µg $KHCO_3$ | Blank (no mix) |

The array plate was heated under a flowing nitrogen stream using a temperature controlled heating block. The temperature program was to heat rapidly to 175° C. and hold for 15 minutes, heat to 250° C. and hold for 15 minutes and finally heat to 300° C. and hold for 20 minutes. The array was then removed from the heating block and cooled rapidly on a metal surface.

Fluorescence imaging of the entire array was carried out using a SONY Color Video camera fitted with a 418 nm high-pass filter to exclude the excitation light, a low-power UV illuminator with a nominal 365 nm output filter to excite the fluorescence and an image capture board in a Macintosh computer. The resulting image showed the development of fluorescence only in the reaction arrays containing one of the catalysts and none in the blank arrays. No variations in fluorescence intensity, other than thickness related, were observed across the product films although no active mixing was applied during reaction.

Figure 2:
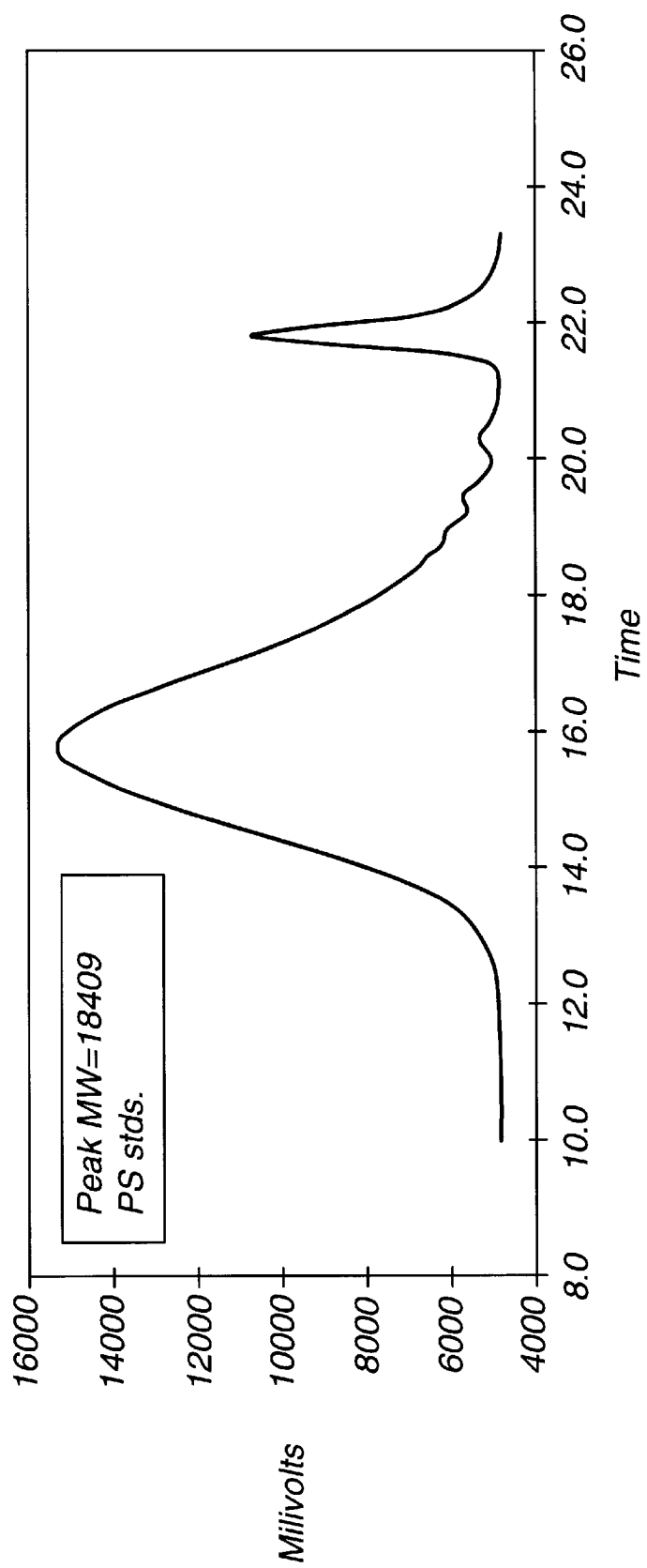
FIG. 2 is a graphical representation of the GPC data described in Example 1 infra.

Isolation of the polymer from a similar reaction run using NaOH catalyst and analysis by traditional GPC gave the trace in FIG. 2. This had a styrene-equivalent molecular weight of 24029 (equal to about 12000 Daltons in PC absolute Mw). The trace shows some oligomers as well as what is likely leftover BPA or DPC at 22 minutes.

Example 2

Solutions of BPA and DPC in acetone were added to half-inch diameter quartz vials such that 100 mg of total reagent weight was delivered to each vial. Then, each of the vials were dosed with 10 microliters of a dilute catalyst solution containing tetramethylammonium hydroxide (250 ppb equivalent) and sodium hydroxide (100 ppb equivalent) and the solvents allowed to evaporate at 80° C. on the reaction block under a nitrogen stream. The reaction, vials were then inserted into tight fitting wells on the heating block and the temperature ramped to 175° C., held for 10 minutes; ramped to 220° C. and held for 15 minutes, ramped to 240° C. and held for 15 minutes and finally ramped to 300° C. and held for 15 minutes. The reactions were stopped by immersing the bottom portion of the vial in cold water for several seconds. The polymer films were determined to be approximately 0.5 mm in thickness and showed no evidence of bubbling that might indicate trapped volatiles. Chloroform solvent was added to the vials and after a short period for dissolution, the solutions were removed for analysis. Molecular weight analysis was carried out using a standard GPC instrument. The chromatograms showed no evidence of remaining reactants (BPA or DPC). However, they did show some oligomer peaks at the low molecular weight end. The numerical results are shown in Table 2 below:

TABLE 2

GPC Analysis of Six parallel Melt Polymerizations in Open Quartz Vials.

| Sample ID | Mw (Daltons) | Mn (Daltons) | MWD |
|---|---|---|---|
| Cell 1 | 11632 | 1735 | 6.7 |
| Cell 2 | 11320 | 1790 | 6.3 |
| Cell 3 | 11728 | 1637 | 7.2 |
| Cell 4 | 10281 | 1441 | 7.1 |
| Cell 5 | 12228 | 1874 | 6.5 |
| Cell 6 | 10820 | 1722 | 6.3 |

Mean = 11335; St. Dev. = 635; RSD = 5.5%

The melt polymerization under these conditions appears to be quite reproducible and can be used for combinatorial-type approaches to catalyst optimization, process optimization and new material evaluation on a micro-scale. The scale of the reaction has been practiced up to 100 mg per well. As noted, limitations on scale are dependent on having a sufficiently thin film that loss of volatile by-products is not limited by diffusion through the film.

Example 3

Another series of polymer melt reactions with various catalysts was performed using a glass 96 well micro-titer plate. The glass reaction plate was soaked in an $H_2SO_4$/No-Chromix bath for several hours and rinsed several times with DI water to decrease sodium contamination. Separate solutions of 15% wt/vol. BPA(Chiba) and DPC(Chiba) were made in acid rinsed plastic volumetric flasks using electronics grade acetone (<50 ppb Na). The catalysts solutions shown in Table 3 were made in the same fashion with the appropriate dilution.

TABLE 3

Catalyst solutions for BPA/DPC melt reaction.

| Catalyst | Compound | Concentrations/ppm |
|---|---|---|
| Na | NaOH | 2500, 25, 2.5 |
| $(Butyl)_4N$ | tetrabutyl ammonium $PF_6$ | 100, 50, 0.5 |
| Na | $Na(CH_3CO_2)$ | 100, 40, 0.5 |
| Cs | $CsNO_3$ (0.001 aq. soln.) | 10, 0.1 |

The solutions (150 µl) were added to the wells sequentially using an electronic eight-tip pipette. The solvent was evaporated under vacuum at ambient temperature. The reaction took place under a positive nitrogen pressure of 2 psi using the temperature profile described in Table 4:

TABLE 4

Oven temperature profile.

| Temperature/C. | Ramp Time/minutes | Set Time/minutes |
|---|---|---|
| 80 | 15 | 5 |
| 200 | 40 | 10 |
| 240 | 10 | 5 |

The microplate was removed at 240° C. and immediately quenched with liquid nitrogen. The polymer films were dissolved in dichloromethane for analysis. Analysis of the reaction products by GPC indicate the formation of oligomer species with an average molecular weigh (Mw) between 2000 and 3000 Daltons as compared to polystrene.

Fluorescence measurements were made using the modified microplate fluorometer described supra. All measurements were made using a 355 nm excitation/460 emission filter. Measurements were made on both solid films and solutions. The precision of the solution measurements was higher than the solids due to the non-homogenous distribution of the polymer film after cooling the reaction. The calibration curve using the fluorescence intensity as a function of Fries concentration in polymer solutions is shown in FIG. 3.

Figure 3:
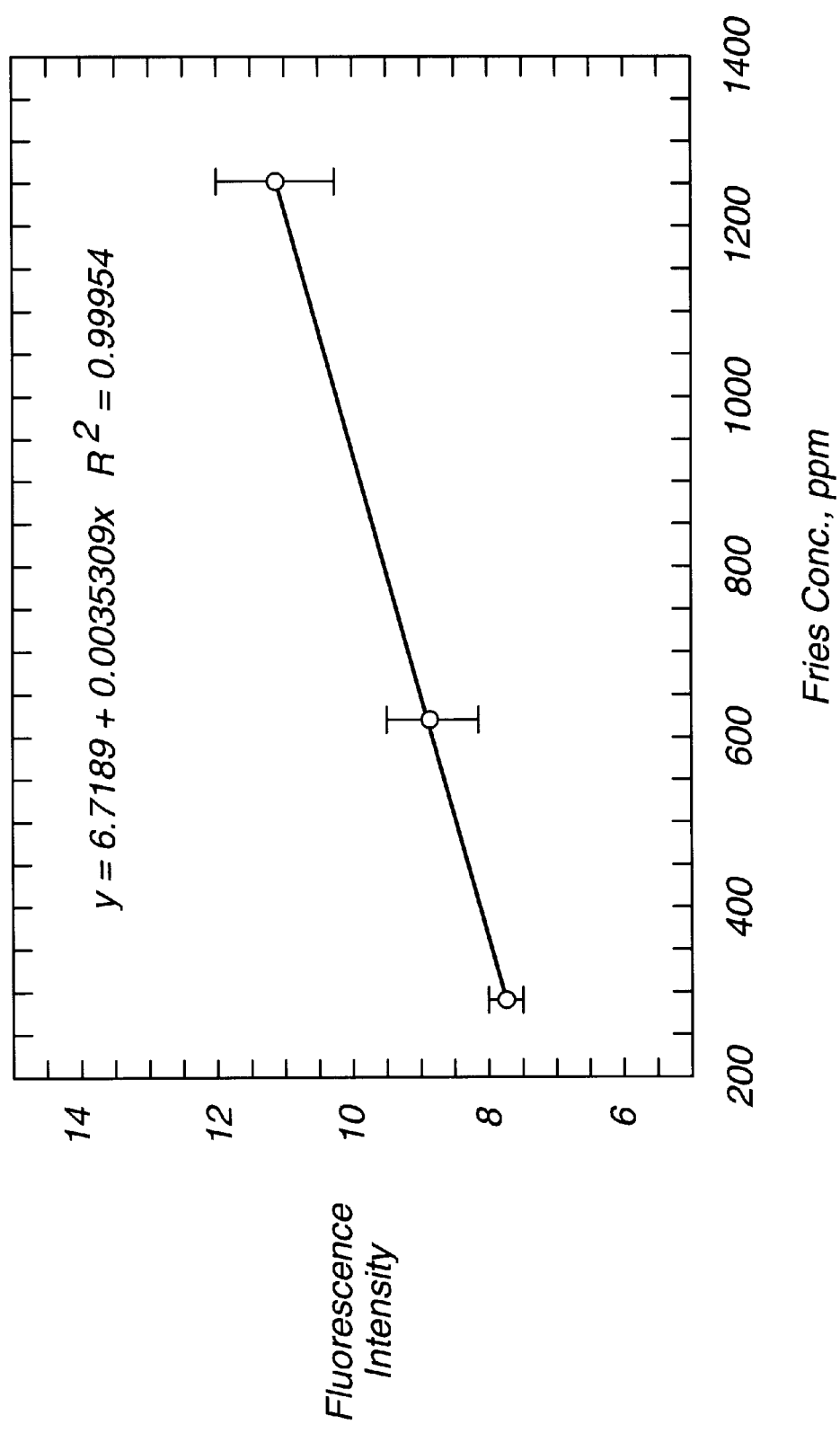
FIG. 3 is a graphical representation of a calibration curve as described in Example 3 infra.

As can be seen in FIG. 3, three solutions of polycarbonate in dichloromethane containing three Fries concentrations (287, 620, and 1252 ppm) were prepared. A calibration curve was constructed by averaging fluorescence intensities of eight different wells. Percent relative standard deviation for the three concentrations was 11%, 6%, and 9%, respectively.

Figure 4A:
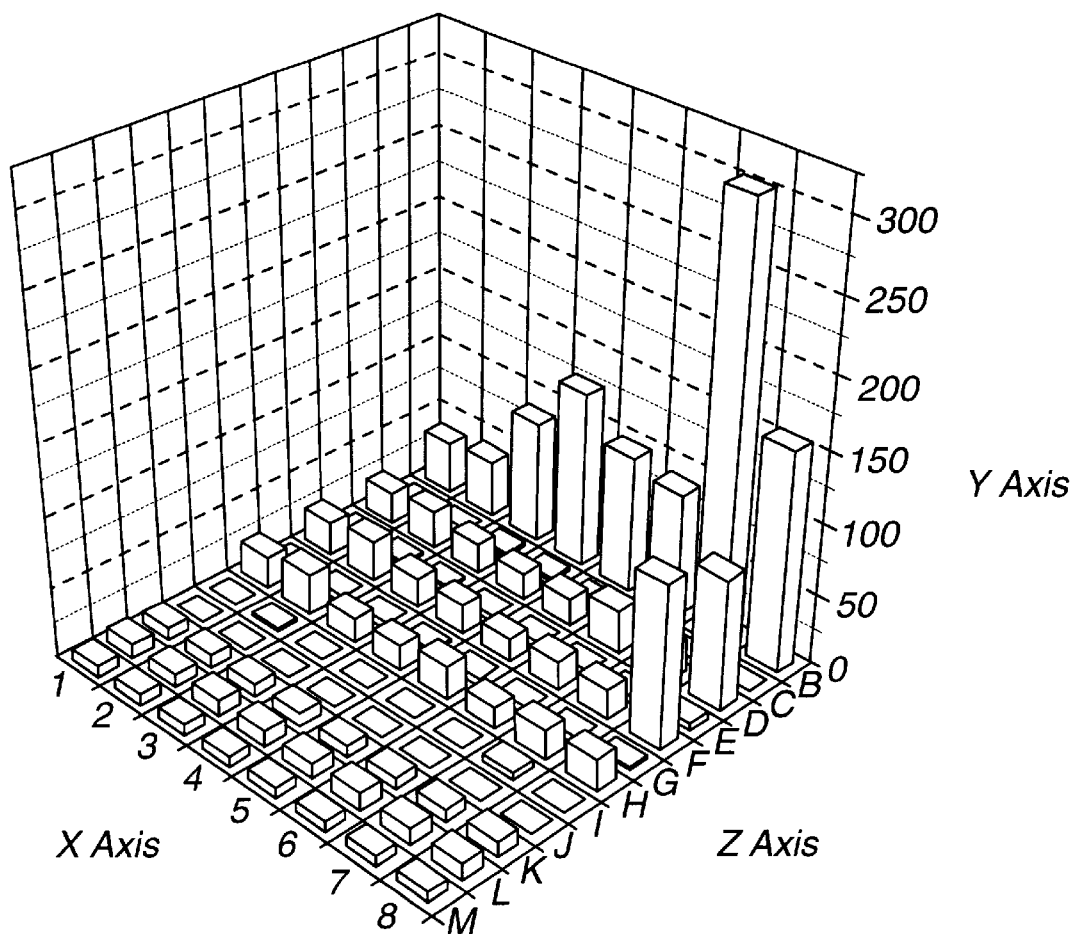
FIGS. 4*a* and 4*b* are three-dimensional graphical representations of fluorescence intensities of reaction products as described in Example 3 infra.
Figure 4B:
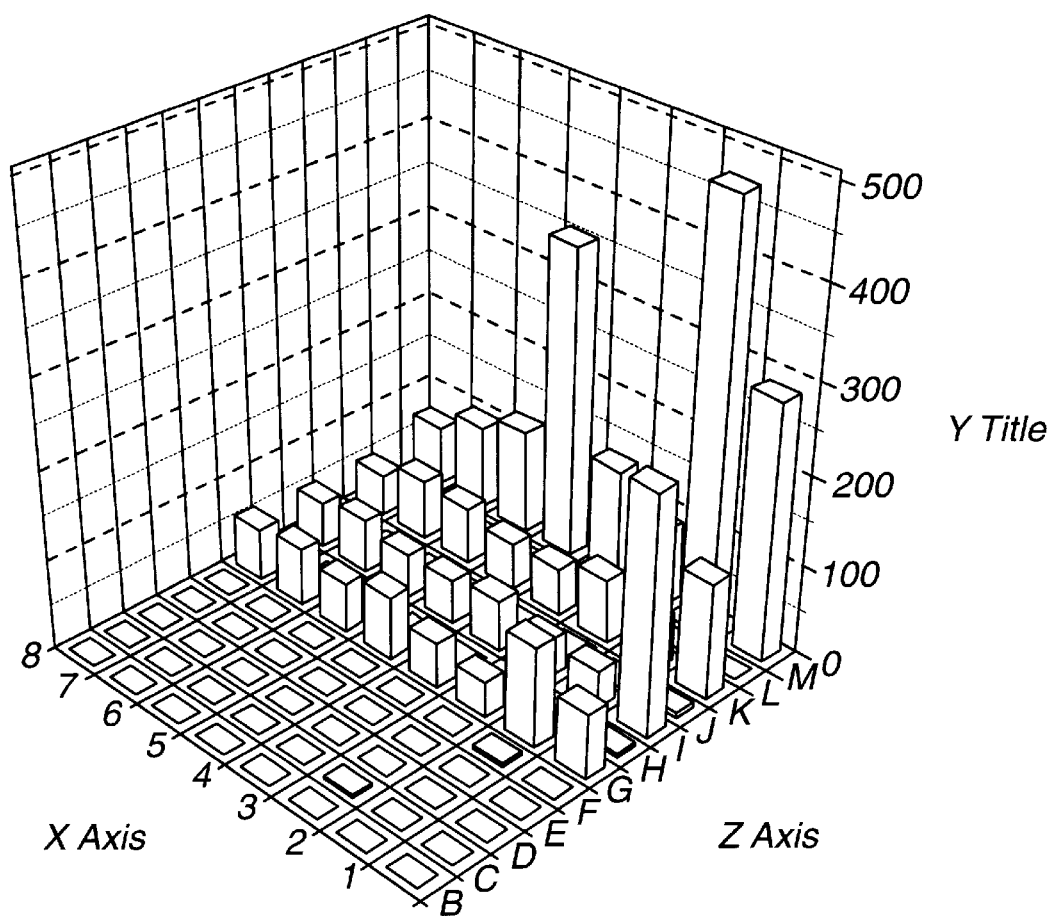

The fluorescence intensity for reaction products as a function of NaOH concentration is shown in FIGS. 4a and 4b. FIG. 4a depicts the results for 500 μl of polymer solution, column B, D, F, and H contained 2500, 25, 2.5 and 0 ppm of NaOH, respectively. Columns K, L, and M contain the three reference solutions with 620, 1252, 287 ppm Fries, respectively. FIG. 4b shows the results from the thin polymer film method. The raw fluorescence intensity data from which FIGS. 4a and 4b are derived is set forth in Tables 5a and 5b, respectively:

TABLE 5a

Raw data for FIG. 4a

| A | B | C | D | E | F | G | H | I | J | K | L |
|---|---|---|---|---|---|---|---|---|---|---|---|
| 8.0 | 10.5 | 8.9 | 0.7 | 0.8 | 22.7 | 3.2 | 22.9 | 1.2 | 21.7 | 0.7 | 37.1 |
| 7.7 | 9.6 | 9.0 | 0.7 | 1.7 | 30.6 | 0.9 | 27.9 | 1.2 | 25.6 | 1.0 | 40.2 |
| 7.7 | 11.3 | 8.9 | 0.8 | 0.7 | 16.3 | 1.1 | 20.3 | 1.6 | 20.2 | 2.2 | 85.7 |
| 7.5 | 11.8 | 9.5 | 0.7 | 0.7 | 16.9 | 1.8 | 20.3 | 0.7 | 18.3 | 2.2 | 124.8 |
| 7.4 | 10.7 | 8.3 | 1.6 | 0.7 | 23.7 | 0.7 | 15.9 | 0.7 | 19.7 | 2.0 | 96.3 |
| 8.1 | 12.4 | 8.0 | 1.1 | 0.7 | 14.9 | 0.7 | 19.6 | 0.7 | 30.4 | 0.9 | 87.8 |
| 7.7 | 11.7 | 8.2 | 1.2 | 4.6 | 20.7 | 0.7 | 21.1 | 0.9 | 23.0 | 0.7 | 301.2 |
| 7.9 | 11.3 | 10.1 | 1.3 | 0.9 | 21.5 | 2.7 | 115.1 | 3.8 | 92.1 | 0.8 | 154.0 |

TABLE 5b

Raw data for FIG. 4b

| A | B | C | D | E | F | G | H | I | J | K | L |
|---|---|---|---|---|---|---|---|---|---|---|---|
| 300.0 | 0.7 | 129.5 | 4.5 | 258.8 | 3.7 | 64.2 | 0.7 | 1.4 | 0.6 | 0.6 | 0.5 |
| 500.8 | 0.7 | 59.0 | 0.8 | 42.6 | 0.9 | 110.1 | 2.8 | 1.4 | 0.6 | 0.5 | 0.7 |
| 94.5 | 0.9 | 76.9 | 1.0 | 45.9 | 0.8 | 39.7 | 0.7 | 0.7 | 0.5 | 2.0 | 0.5 |
| 123.6 | 2.4 | 50.6 | 0.7 | 60.8 | 0.7 | 56.6 | 0.7 | 0.7 | 0.7 | 0.7 | 0.6 |
| 383.3 | 0.6 | 58.1 | 0.8 | 54.0 | 0.8 | 72.2 | 0.7 | 0.6 | 0.6 | 0.8 | 0.5 |
| 129.7 | 0.8 | 66.6 | 0.7 | 53.4 | 0.9 | 55.4 | 0.6 | 1.1 | 0.5 | 0.7 | 0.6 |
| 104.1 | 1.0 | 68.0 | 0.7 | 67.9 | 1.3 | 61.9 | 0.8 | 0.6 | 0.7 | 0.9 | 0.5 |
| 66.4 | 0.7 | 47.3 | 0.6 | 47.3 | 1.6 | 65.9 | 0.8 | 0.8 | 0.6 | 0.8 | 0.7 |

The reaction properties for column F in FIG. 4a, 2.5 ppm NaOH, demonstrate the lowest average fluorescence intensity for the NaOH series, 22 with an 18% RSD (minus the outlier). Also of importance is the lack of cross-talk between reaction columns as shown by the very low intensities in columns C, E G, I, and J, which contained no reaction solution. As observed in column H, there is significant formation of Fries products without the catalyst. This suggests that contaminants in the glass may play a catalytic role in the reaction and cause a lower limit threshold for the amount of catalyst used.

Figure 5A:
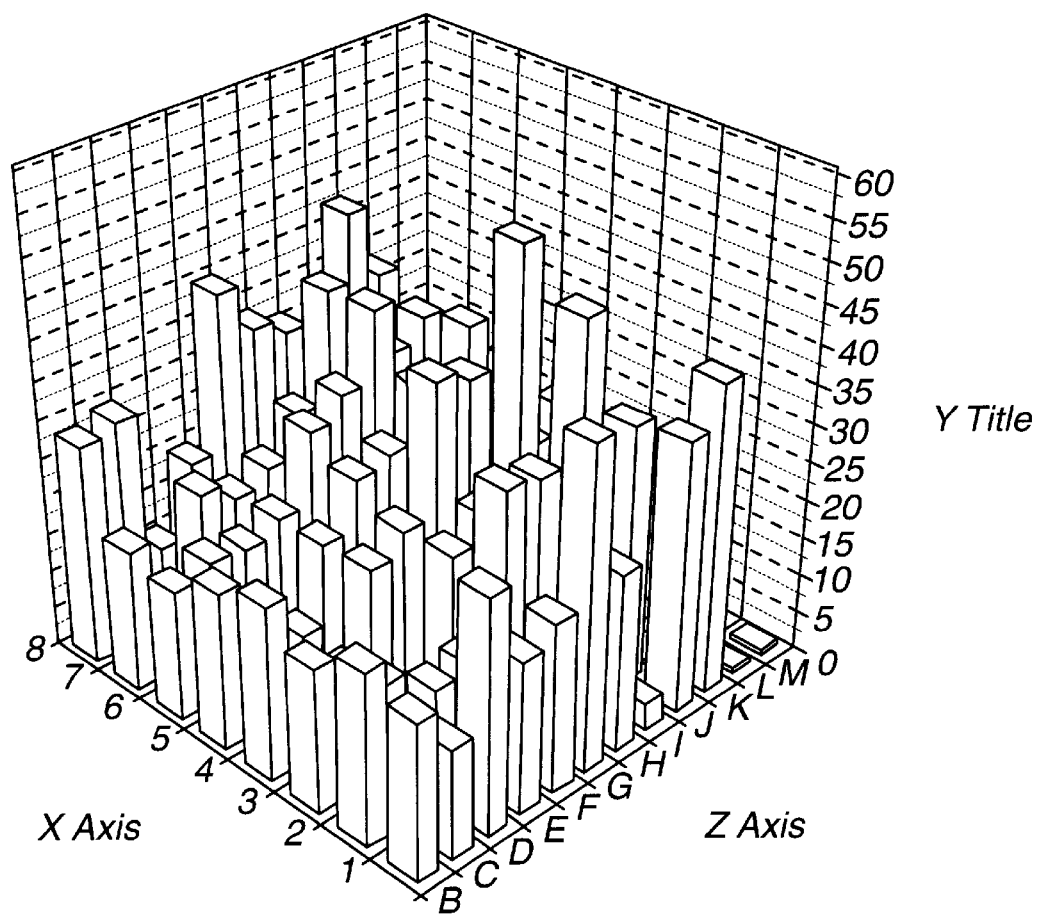
FIGS. 5*a* and 5*b* are three-dimensional graphical representations of fluorescence intensities of reaction products as described in Example 3 infra.
Figure 5B:
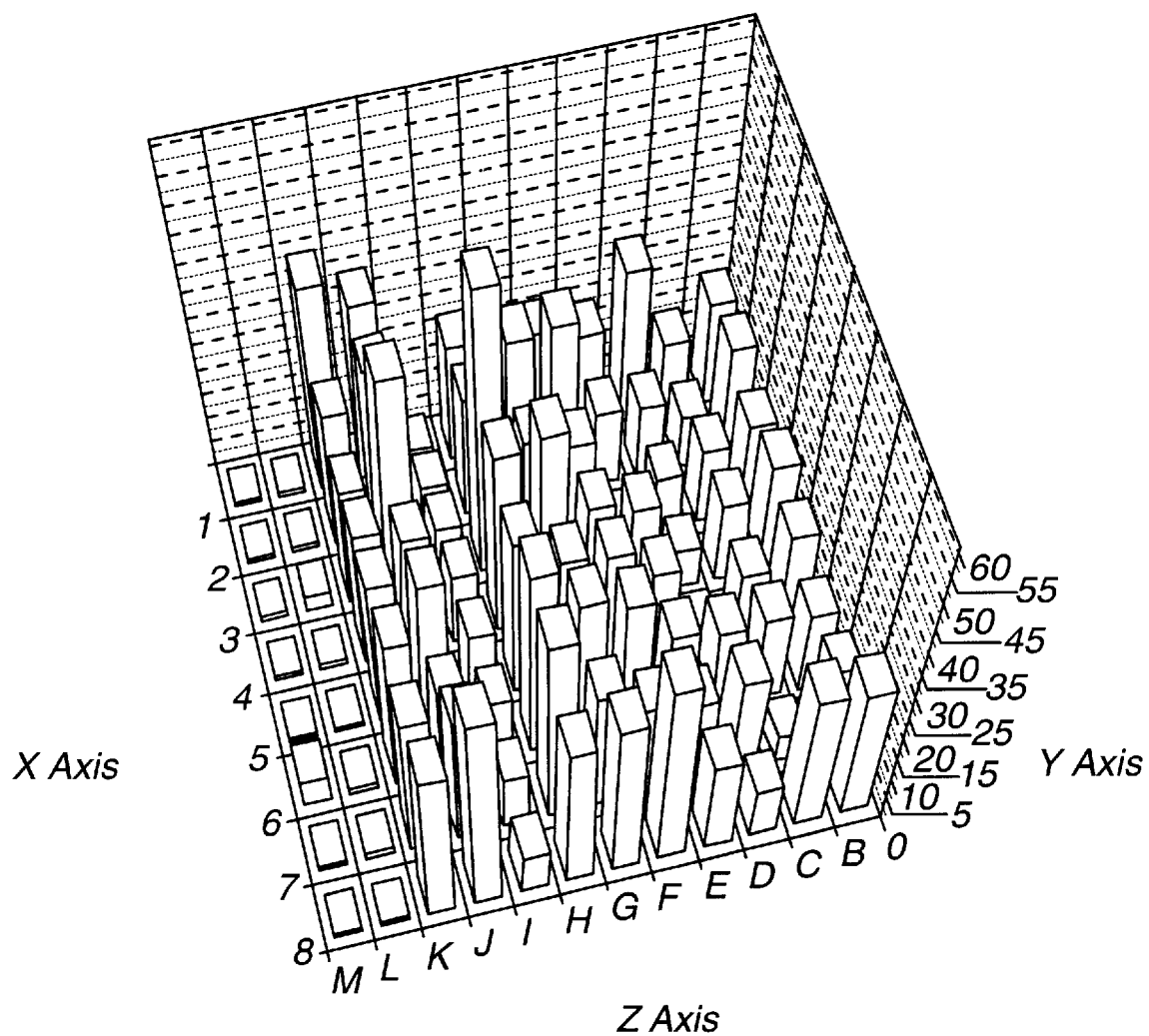

The fluorescence intensities for a second series of reactions using the remaining catalysts described in Table 3 are shown in FIGS. 5a and 5b, wherein each column represents eight replicates of the reaction and the catalyst loading is as follows: Columns B, C, D correspond to tetrabutyl ammonium $PF_6$ at 100, 50, and 0.5 ppm; columns E, F, G correspond to $Na(CH_3CO_2)$ at 100, 40, and 0.5 ppm; columns H and I correspond to $Cs(NO_3)$ at 10 and 1 ppm additions; columns J and K contained no catalyst. FIGS. 5a and 5b are the same data with different view angles. The actual data is set forth in Table 6.

TABLE 6

Data for FIGS. 5a and 5b

| A | B | C | D | E | F | G | H | I | J | K | L |
|---|---|---|---|---|---|---|---|---|---|---|---|
| 0.6 | 0.7 | 40.0 | 34.9 | 3.5 | 23.0 | 41.3 | 21.9 | 19.5 | 30.1 | 14.0 | 20.0 |
| 0.6 | 1.0 | 27.1 | 33.6 | 7.7 | 24.5 | 33.6 | 34.5 | 15.2 | 14.6 | 10.6 | 22.2 |
| 0.7 | 2.9 | 24.0 | 44.0 | 11.5 | 56.2 | 25.5 | 22.7 | 3.3 | 11.3 | 15.2 | 18.6 |
| 0.6 | 0.8 | 27.7 | 24.6 | 14.4 | 37.3 | 39.1 | 22.4 | 19.8 | 8.3 | 16.2 | 22.4 |
| 0.6 | 0.9 | 30.7 | 28.6 | 14.7 | 33.1 | 26.7 | 25.5 | 19.4 | 4.4 | 14.2 | 20.3 |
| 5.6 | 0.9 | 32.3 | 19.1 | 13.5 | 39.9 | 31.3 | 28.5 | 19.3 | 17.5 | 18.1 | 16.8 |
| 1.2 | 0.9 | 30.5 | 27.6 | 11.3 | 39.3 | 25.6 | 20.4 | 18.5 | 21.2 | 5.5 | 18.3 |
| 0.6 | 0.6 | 33.3 | 43.1 | 8.5 | 31.2 | 33.6 | 40.0 | 19.8 | 10.5 | 29.6 | 28.5 |

The catalysts were selected for either their known selectivity in the formation of Fries in the melt reaction (Na, Cs) or as a good catalyst candidate ($PF_6$) in large scale reactions. As seen in FIGS. 5a and 5b, column H (Cs) has the lowest fluorescence intensity. Directly comparing the average fluorescence intensity of the NaOH catalyzed reaction with Cs, the intensity attributed to Fries products is less for the Cs reaction (NaOH Intensity=22 w/18% RSD, Cs Intensity=17 w/36% RSD).

It will be understood that each of the elements described above, or two or more together, may also find utility in applications differing from the types described herein. While the invention has been illustrated and described as embodied in a method for parallel melt-polymerization, it is not intended to be limited to the details shown, since various modifications and substitutions can be made without departing in any way from the spirit of the present invention. For example, robotic equipment may be used to prepare the reaction mixtures and various other types of parallel screening methods may be used in conjunction with the ones disclosed. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A method for conducting parallel polymerization reactions, said method comprising the steps of:
   providing an array of reaction vessels;
   providing a plurality of homogenous reaction mixtures within said reaction vessels, each mixture comprising monomers at least partially embodied in a liquid and being provided in an amount sufficient to form a film having a thickness sufficient to allow the reaction rate of said polymerization reaction to be essentially independent of mass transport;
   polymerizing said monomers with a catalyst at reaction conditions effective in substantially maintaining the homogeneity of said reaction mixture; and
   analyzing the products obtained.

2. The method of claim 1, wherein the polymerizing step is performed without stirring the contents of the reaction vessels.

3. The method of claim 1, wherein said amount of reaction mixture is less than 1 gram.

4. The method of claim 3, wherein said amount of said reaction mixture is less than 100 mg.

5. The method of claim 4, wherein said amount of said reaction mixture is less than 50 mg.

6. The method of claim 1, wherein said polymerizing step comprises raising the reaction temperature over the course of said polymerization reaction.

7. The method of claim 6, wherein said step of raising said reaction temperature further comprises a first step of raising said reaction temperature to between about 100° C. and about 200° C. and maintaining said reaction temperature for between about 5 and about 60 minutes.

8. The method of claim 7, wherein said first step includes raising said reaction temperature to between about 150° C. and about 200° C.

9. The method of claim 8, wherein said reaction temperature is maintained for between about 15 and about 45 minutes.

10. The method of claim 9, wherein said reaction temperature is maintained for between about 15 and about 30 minutes.

11. The method of claim 8, wherein said first step includes raising said reaction temperature to between about 175° C. and about 185° C.

12. The method of claim 7, wherein said step of raising said reaction temperature further comprises a second step of raising said reaction temperature to between about 210° C. and about 260° C. and maintaining said reaction temperature for between about 5 and about 60 minutes.

13. The method of claim 12, wherein said second step includes raising said reaction temperature to between about 220° C. and about 250° C.

14. The method of claim 13, wherein said reaction temperature is maintained for between about 15 and about 45 minutes.

15. The method of claim 14, wherein said reaction temperature is maintained for between about 15 and about 30 minutes.

16. The method of claim 13, wherein said second step includes raising said reaction temperature to between about 240° C. and about 245° C.

17. The method of claim 12, wherein said step of raising said reaction temperature further comprises a third step of raising said reaction temperature to between about 270° C. and about 400° C. and maintaining said reaction temperature for between about 5 and about 60 minutes.

18. The method of claim 17, wherein said third step includes raising said reaction temperature to between about 280° C. and about 350° C.

19. The method of claim 18, wherein said reaction temperature is maintained for between about 15 and about 45 minutes.

20. The method of claim 19, wherein said reaction temperature is maintained for between about 15 and about 30 minutes.

21. The method of claim 18, wherein said third step includes raising said reaction temperature to between about 285° C. and about 310° C.

22. The method of claim 17, wherein said step of raising said reaction temperature further comprises an additional step of raising said reaction temperature to between about 230° C. and about 250° C. and maintaining said reaction temperature for between about 5 and about 60 minutes, said additional step being performed after said second step and before said third step.

23. The method of claim 22, wherein said reaction temperature is maintained for between about 15 and about 45 minutes.

24. The method of claim 23, wherein said reaction temperature is maintained for between about 15 and about 30 minutes.

25. The method of claim 6, wherein said reaction temperature is increased in a manner effective in avoiding substantial loss of reaction components through vaporization.

26. The method of claim 6, wherein said reaction temperature is increased in a manner effective in permitting said reaction mixtures to substantially reach chemical equilibrium.

27. The method of claim 1, wherein said reactions produce products having aromatic carbonate chain units.

28. The method of claim 27, wherein one or more of said monomers is bisphenol.

29. The method of claim 27, wherein one or more of said monomers is bisphenol-A.

30. The method of claim 27, wherein one or more of said monomers is diphenylcarbonate.

31. The method of claim 27, wherein one or more of said monomers is phosgene.

32. The method of claim 27, wherein the products of the reactions are bisphenol-A polycarbonates.

33. The method of claim 27, wherein the products of the reactions are soft-segment polycarbonates.

34. The method of claim 27, wherein the products of the reactions are high-heat polycarbonates.

35. The method of claim 1, wherein said array of reaction vessels comprises a microtiter plate.

36. The method of claim 6, wherein said reaction conditions include contacting said reaction mixture with a flowing inert gas atmosphere.

37. The method of claim 36, wherein said inert gas is nitrogen.

38. The method of claim 6, wherein said reactions conditions include providing a vacuum in said reaction vessels.

39. The method of claim 1, wherein said monomers are premixed to form said plurality of homogeneous reaction mixtures before introducing said mixtures into said reaction vessels.

40. A method for conducting parallel melt-polymerization reactions, said method comprising the steps of:

providing an array of reaction vessels;

premixing bisphenol-A and diphenylcarbonate to form a plurality of homogeneous reaction mixtures;

charging less than 100 mg of each of said reaction mixtures into each of said reaction vessels thereby providing a reaction film having a thickness sufficient to allow the reaction rate of the polymerization reaction to be essentially independent of mass transport;

polymerizing said bisphenol-A and diphenylcarbonate with a catalyst at reaction conditions effective in substantially maintaining the homogeneity of said reaction mixture without stirring, said polymerizing including the steps of increasing the reaction temperature in a stepwise manner such as to avoid substantial loss of reaction components through vaporization and maintaining the reaction temperature at each step until said reaction mixtures substantially reach chemical equilibrium; and analyzing the products obtained.

* * * * *